(12) United States Patent
Chen et al.

(10) Patent No.: US 12,059,984 B2
(45) Date of Patent: Aug. 13, 2024

(54) INFANT CARRIER

(71) Applicant: WONDERLAND SWITZERLAND AG, Steinhausen (CH)

(72) Inventors: Rui-Bin Chen, Guangdong (CN); Hongbin Xu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 156 days.

(21) Appl. No.: 17/775,688

(22) PCT Filed: Nov. 11, 2020

(86) PCT No.: PCT/EP2020/081794
§ 371 (c)(1),
(2) Date: May 10, 2022

(87) PCT Pub. No.: WO2021/094394
PCT Pub. Date: May 20, 2021

(65) Prior Publication Data
US 2022/0402411 A1   Dec. 22, 2022

(30) Foreign Application Priority Data

Nov. 11, 2019   (CN) .......................... 201911103347.8

(51) Int. Cl.
*A47D 13/02*   (2006.01)
*B60N 2/28*    (2006.01)

(52) U.S. Cl.
CPC .......... *B60N 2/2845* (2013.01); *A47D 13/025* (2013.01)

(58) Field of Classification Search
CPC ... B60N 2/2845; B60N 2/2848; A47D 13/025
See application file for complete search history.

(56) References Cited

U.S. PATENT DOCUMENTS

| | | | |
|---|---|---|---|
| 5,188,380 A * | 2/1993 | Tucek | B62B 7/145 280/47.38 |
| 8,434,781 B2 * | 5/2013 | Mazar | B60N 2/2863 280/30 |

(Continued)

FOREIGN PATENT DOCUMENTS

| | | |
|---|---|---|
| CN | 104337282 A | 2/2015 |
| CN | 109330255 A | 2/2019 |

(Continued)

OTHER PUBLICATIONS

Taiwanese Office Action for Application No. 109139181 dated Jul. 15, 2021, along with English Translation of Search Report.

(Continued)

*Primary Examiner* — Timothy J Brindley
(74) *Attorney, Agent, or Firm* — Volpe Koenig

(57) ABSTRACT

An infant carrier includes an infant support portion, a carrying handle and a locking mechanism. The carrying handle includes a handle part and a side segment, the side segment being pivotally connected with the infant support portion, and the handle part being slidably connected with the handle part, the handle part and the side segment being rotatable in unison relative to the infant support portion for adjusting an inclination of the carrying handle, and the handle part being slidable relative to the side segment for adjusting an extension of the handle part from the side segment. The locking mechanism is carried with the handle part and is operable to lock the handle part to the side segment so that the handle part is held at a desired extension from the side segment.

20 Claims, 8 Drawing Sheets

(56) References Cited

U.S. PATENT DOCUMENTS

| | | | | |
|---|---|---|---|---|
| 9,505,321 | B2* | 11/2016 | Mazar | B60N 2/2845 |
| 10,035,437 | B1* | 7/2018 | Ballard | B60N 2/2842 |
| 2002/0060444 | A1* | 5/2002 | Cote | B60N 2/2806 |
| | | | | 280/648 |
| 2003/0015894 | A1* | 1/2003 | Bargery | B60N 2/2848 |
| | | | | 297/118 |
| 2004/0173997 | A1 | 9/2004 | Voll | |
| 2013/0009428 | A1 | 1/2013 | Heisey | |
| 2017/0240072 | A1* | 8/2017 | Wright | B60N 2/2848 |
| 2018/0065654 | A1 | 3/2018 | Chen | |
| 2022/0388561 | A1* | 12/2022 | Hotard | B60N 2/2848 |

FOREIGN PATENT DOCUMENTS

| | | | | |
|---|---|---|---|---|
| CN | 115120067 | A * | 9/2022 | |
| DE | 10108415 | A1 | 8/2002 | |
| WO | 03/008228 | A1 | 1/2003 | |
| WO | 2010/119446 | A2 | 10/2010 | |
| WO | WO-2010119446 | A2 * | 10/2010 | B60N 2/2845 |
| WO | WO-2011017180 | A2 * | 2/2011 | B60N 2/2821 |

OTHER PUBLICATIONS

German Office Action for Application No. 11 2020 005 583.3 dated Jul. 4, 2023, along with English Translation.
International Search Report and Written Opinion for PCT/EP2020/081794 dated Feb. 25, 2021.

* cited by examiner

INFANT CARRIER

CROSS-REFERENCE TO RELATED APPLICATION(S)

This application is a 371 National Stage Entry of International Application No. PCT/EP2020/081794, filed on Nov. 11, 2020, which claims priority to China patent application no. 201911103347.8 filed on Nov. 11, 2019.

BACKGROUND

1. Field of the Invention

The present invention relates to infant carriers having a carrying handle.

2. Description of the Related Art

Safety legislations require the use of a child safety seat for seating a young child in a motor vehicle. The child safety seat may include an infant carrier supported on a bottom base, and can be fastened on the vehicle seat with a seatbelt of the vehicle or a separate strap secured or provided with the child safety seat. Moreover, the infant carrier may be detached from the bottom base, and transported with a carrying handle provided on the infant carrier. Unfortunately, most infant carriers have a carrying handle that can only be rotationally adjusted, which may not be convenient to use when a child of a greater size is placed in the infant carrier. Although some approaches may propose to add a height adjustment to the carrying handle, they usually are complex in construction and are not convenient to operate.

Therefore, there is a need for an infant carrier having a carrying handle that is more convenient in use and address at least the foregoing issues.

SUMMARY

The present application provides an infant carrier having a carrying handle that is more convenient in use.

According to an embodiment, the infant carrier includes an infant support portion, a carrying handle and a locking mechanism. The carrying handle includes a handle part and a side segment, the side segment being pivotally connected with the infant support portion, and the handle part being slidably connected with the handle part, the handle part and the side segment being rotatable in unison relative to the infant support portion for adjusting an inclination of the carrying handle, and the handle part being slidable relative to the side segment for adjusting an extension of the handle part from the side segment. The locking mechanism is carried with the handle part and is operable to lock the handle part to the side segment so that the handle part is held at a desired extension from the side segment.

According to an embodiment, the handle part has a side portion that is telescopically connected with the side segment, and the locking mechanism includes a latch carried with the side portion of the handle part, the latch being movable to protrude outward or retract toward an interior of the side portion for engaging with or disengaging from the side segment.

According to an embodiment, the locking mechanism further includes an operating part operable to cause the latch to disengage from the side segment, the operating part being placed at a location on the side portion that has the operating part adjacent to an end of the side segment when the handle part is in a fully retracted position relative to the side segment.

According to an embodiment, the latch is slidably connected with the side portion of the handle part.

According to an embodiment, the locking mechanism further includes an actuating part connected with the latch so that the actuating part and the latch are movably linked to each other, whereby the actuating part and the latch are movable in a concurrent manner for engaging and disengaging the latch with respect to the side segment.

According to an embodiment, the actuating part is slidably assembled with the side portion of the handle part, and is slidably connected with the latch.

According to an embodiment, the latch has a pin, and the actuating part has a first and a second ramp surface, the actuating part sliding in a first direction to urge the latch to disengage from the side segment via a sliding contact between the pin and the first ramp surface, and the actuating part sliding in a second direction opposite to the first direction to urge the latch to engage with the side segment via a sliding contact between the pin and the second ramp surface.

According to an embodiment, the actuating part has a U-shaped portion that extends to two opposite sides of the latch, the U-shaped portion having an elongate slot through which the pin is slidably received, the first and second ramp surfaces being respectively defined by two opposite inner edges of the elongate slot.

According to an embodiment, the locking mechanism further includes a spring connected with the actuating part, the spring biasing the actuating part to move in a direction for urging the latch to engage with the side segment.

According to an embodiment, the actuating part is disposed inside the side portion of the handle part, and the locking mechanism further includes an operating part that is connected with the actuating part and is exposed on the handle part for operation.

According to an embodiment, the operating part is slidably connected with the handle part.

According to an embodiment, the operating part includes a sleeve disposed around the side portion.

According to an embodiment, the operating part is connected with the actuating part via a linking element disposed inside the side portion of the handle part.

According to an embodiment, the operating part, the linking element and the actuating part are slidable in unison relative to the side portion of the handle part.

According to an embodiment, the linking element is a rod respectively connected with the operating part and the actuating part.

According to an embodiment, the infant carrier is a child safety seat.

DETAILED DESCRIPTION OF THE EMBODIMENTS

Figure 1:
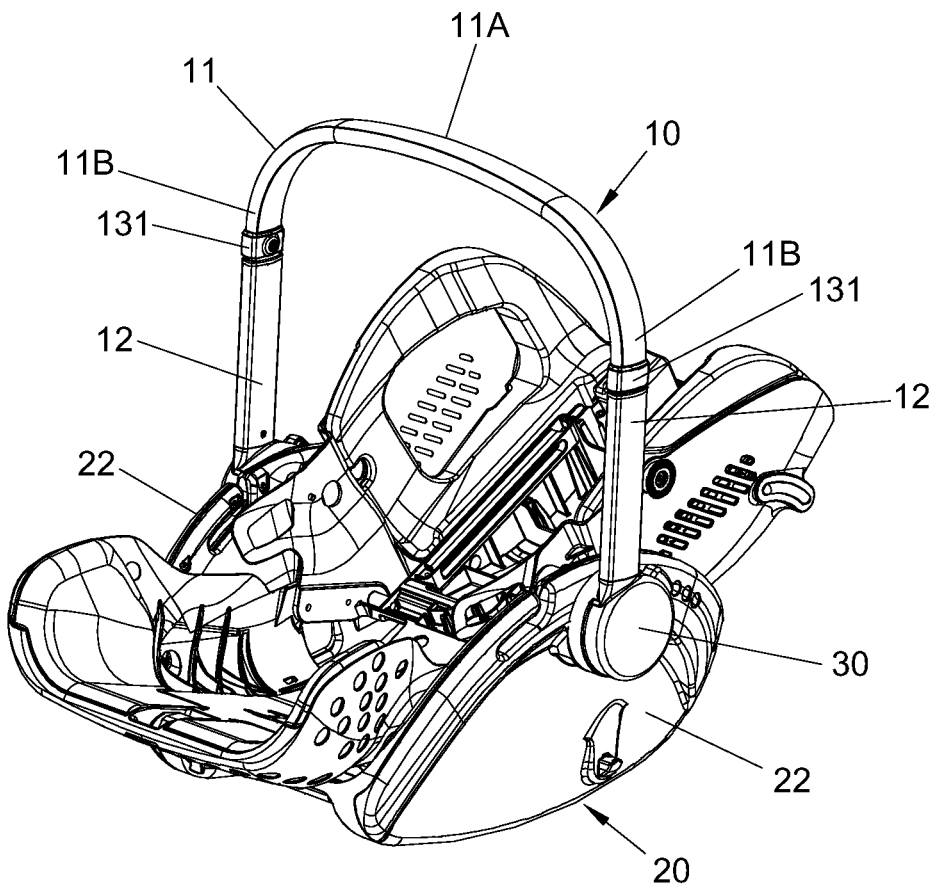
FIG. 1 is a perspective view illustrating an embodiment of an infant carrier.
Figure 2:
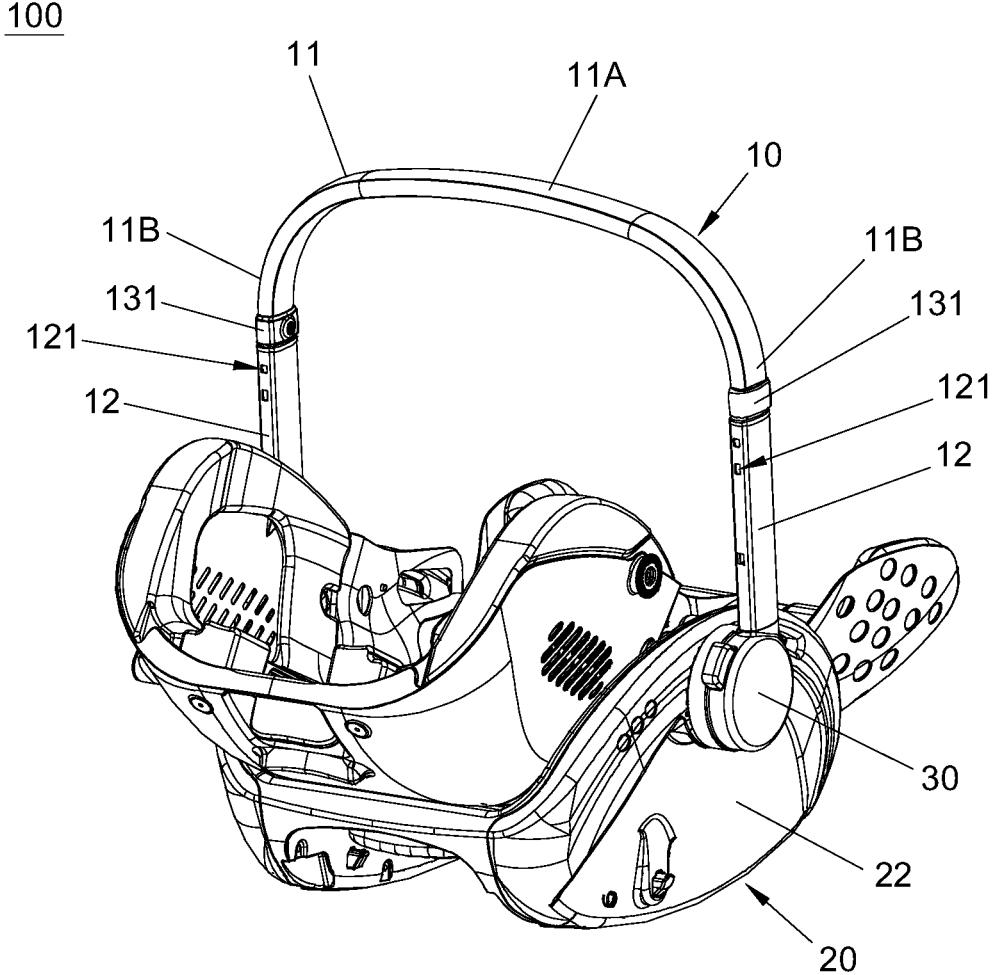
FIG. 2 is another perspective view of the infant carrier shown in FIG. 1.
Figure 3:
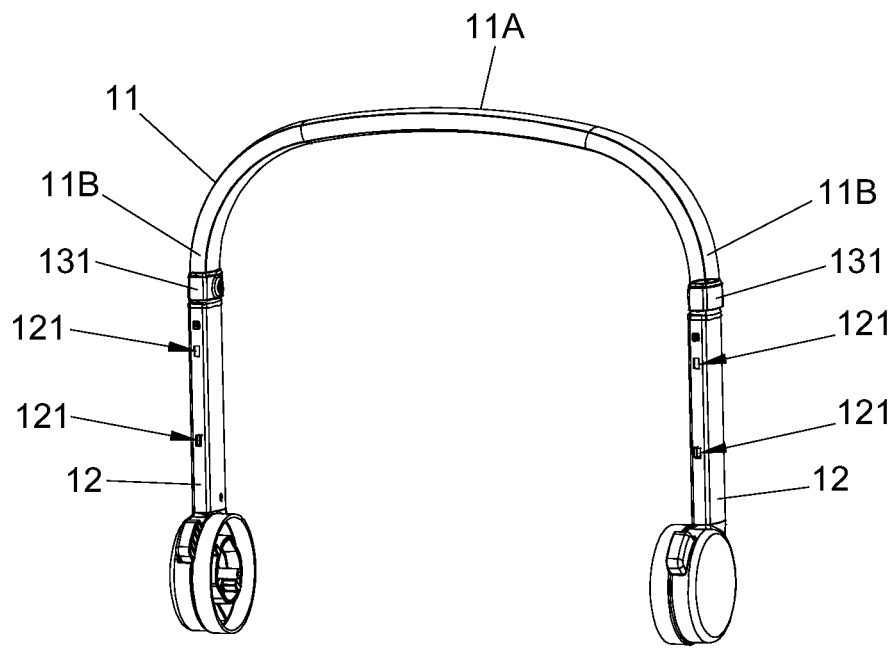
FIG. 3 is a perspective view illustrating a carrying handle provided in the infant carrier.
Figure 4:
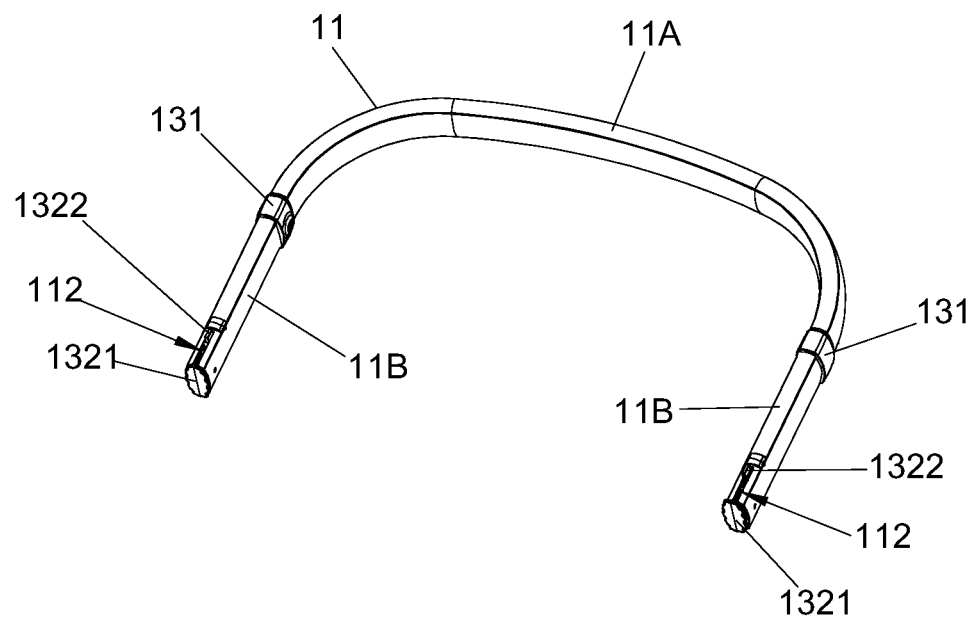
FIG. 4 is a perspective view illustrating a handle part of the carrying handle.
Figure 5:
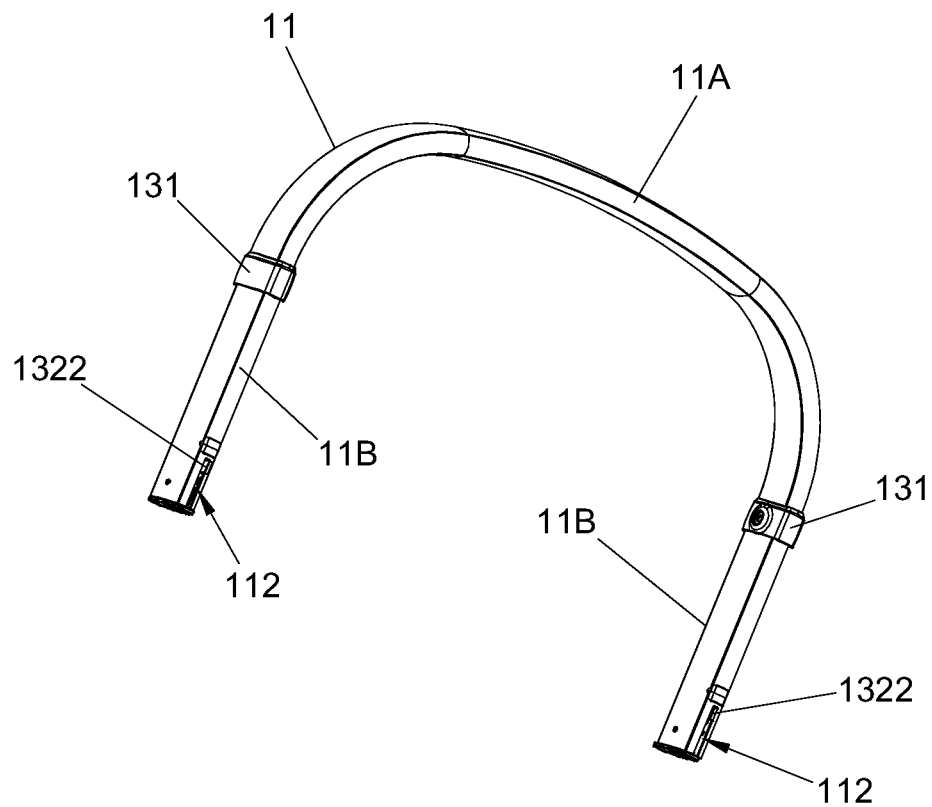
FIG. 5 is another perspective view of the handle part.

FIGS. 1 and 2 are perspective views illustrating an embodiment of an infant carrier 100. Referring to FIGS. 1 and 2, the infant carrier 100 includes an infant support portion 20, and a carrying handle 10 pivotally connected with the infant support portion 20. The infant support portion 20 has an interior adapted to receive a child. For example, the infant support portion 20 can have two sidewalls 22 at a left and a right side that sideways delimit an interior of the infant support portion 20 adapted receive a child. According to an embodiment, the infant carrier 100 can be a child safety seat, and the infant support portion 20 can be a shell body. It will be appreciated, however, that the infant carrier 100 may also include, without limitation, portable bassinets, child seats adapted to be mounted on a child stroller, and the like.

The carrying handle 10 can be pivotally connected with the infant support portion 20 on the two sidewalls 22. The carrying handle 10 can include a handle part 11 and two side segments 12. The handle part 11 can generally have a U-shape including a transversal portion 11A and two side portions 11B. According to an example of construction, the handle part 11 including the transversal portion 11A and the two side portions 11B may be formed as a tubular part. The two side segments 12 can be respectively connected pivotally with the two sidewalls 22 of the infant support portion 20 via two pivot connections 30, and can be respectively connected slidably with the two side portions 11B of the handle part 11. According to an example of construction, each of the two sidewalls 22 can have a top, the two pivot connections 30 of two side segments 12 can be respectively located adjacent to the top of the two sidewalls 22, and the two side segments 12 can extend above the infant support portion 20. According to an example of construction, the two side segments 12 can be tubular segments, and can be respectively connected telescopically with the two side portions 11B of the handle part 11 with the two side portions 11B respectively received at least partially in the two side segments 12. With the construction described herein, the handle part 11 and the two side segments 12 can rotate in unison relative to the infant support portion 20 for adjusting an inclination of the carrying handle 10, and the handle part 11 can slide relative to the two side segments 12 for adjusting an extension of the handle part 11 from the two side segments 12 and thereby adjusting the height of the handle part 11 above the infant support portion 20. This can offer a more flexible and convenient use. For example, the carrying handle 10 can be adjusted to extend at a suitable height above a child placed in the infant support portion 20 for facilitating transport of the infant carrier 100 with the child therein.

In conjunction with FIGS. 1 and 2, FIGS. 3-8 are schematic views illustrating further construction details provided in the carrying handle 10. Referring to FIGS. 3-8, a locking mechanism 13 can be provided to lock the handle part 11 in position relative to each of the two side segments 12 so that the handle part 11 can be held at a desired extension from the side segments 12. More specifically, the same locking mechanism 13 may be provided at each of the left and right side to lock the handle part 11 in position relative to each of the two side segments 12. According to an example of construction, the locking mechanism 13 can be carried with the handle part 11, and can include a latch 1322, an actuating part 1323 and a spring 134.

The latch 1322 is carried with one side portion 11B of the handle part 11, and is movable to protrude outward or retract toward an interior of the side portion 11B for engaging with or disengaging from the side segment 12. For example, the side segment 12 can include a plurality of spaced-apart openings 121 respectively corresponding to different extending lengths of the handle part 11 from the side segment 12, and the latch 1322 can protrude sideways outside the side portion 11B of the handle part 11 to engage with any one of the openings 121 for locking the handle part 11 at a desired extension from the side segment 12. When the latch 1322 retracts inward and disengages from the side segment 12, the handle part 11 can be unlocked from the side segment 12 for sliding adjustment.

According to an example of construction, the latch 1322 can be slidably connected with the side portion 11B of the handle part 11, and can travel through a slit 112 provided on the side portion 11B for engaging with and disengaging from the side segment 12. For example, the side portion 11B of the handle part 11 can be fixedly connected with a mount portion 1321 having a guide slot 13214, and the latch 1322 can be slidably disposed in the guide slot 13214. According to an example of construction, the side portion 11B can have an inner sidewall surface provided with a protrusion 113, and the mount portion 1321 can be inserted into the side portion 11B and fixedly attached thereto via engagement of the protrusion 113 with a notch 13213 provided on the mount portion 1321.

Figure 6:
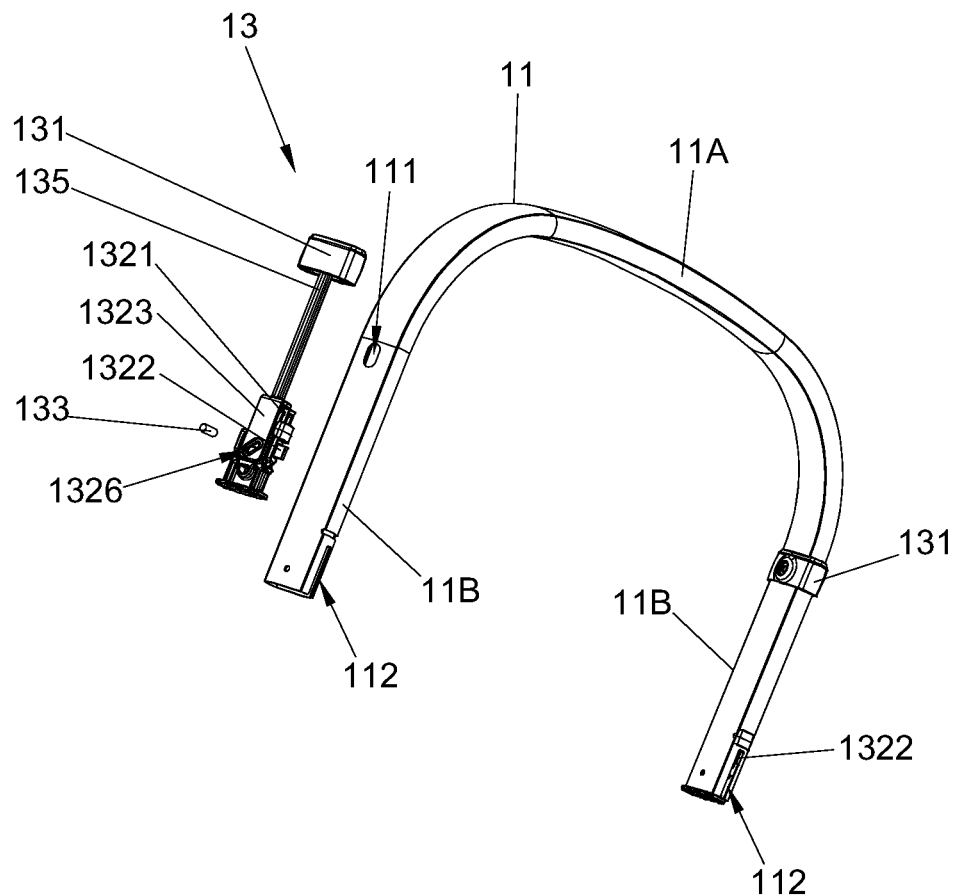
FIG. 6 is a perspective view illustrating a locking mechanism carried with the handle part.
Figure 7:
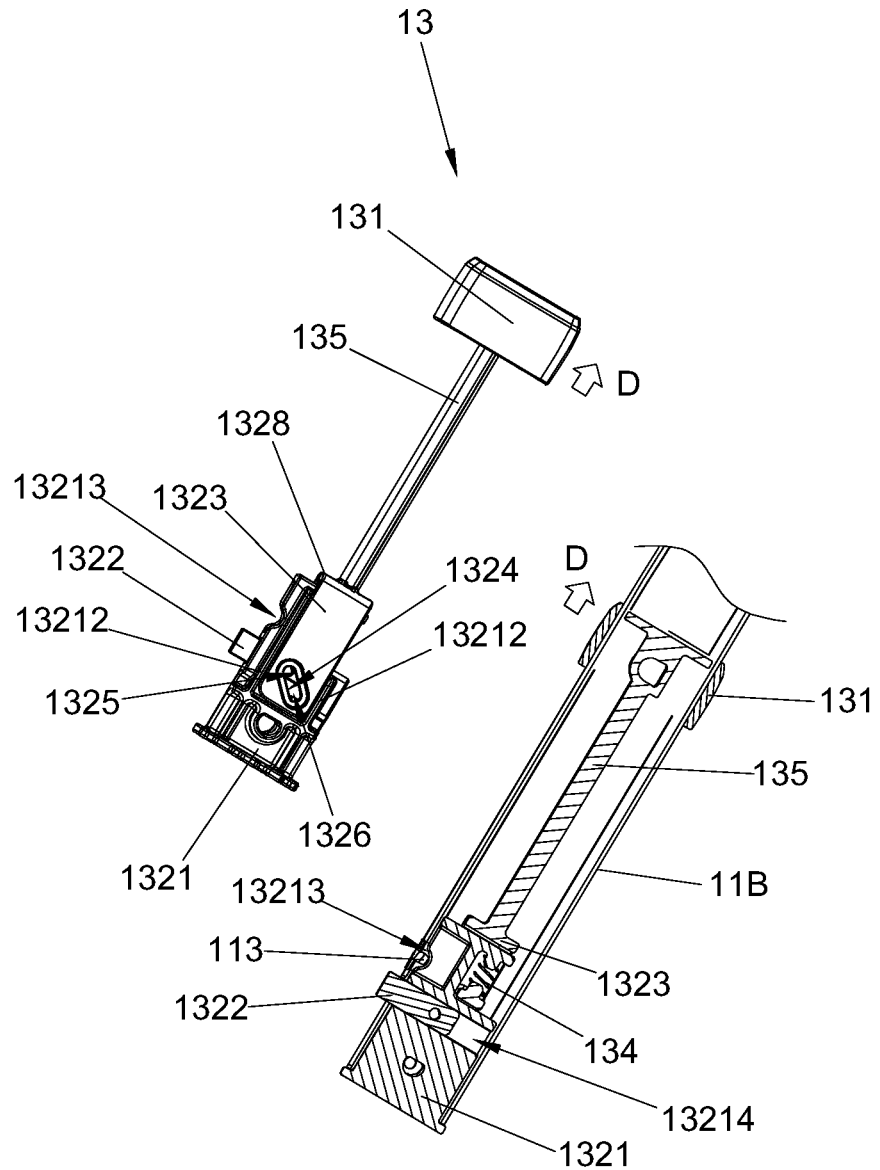
FIG. 7 is a schematic view illustrating the locking mechanism with a latch thereof protruding outward which can correspond to a locking state.
Figure 8:
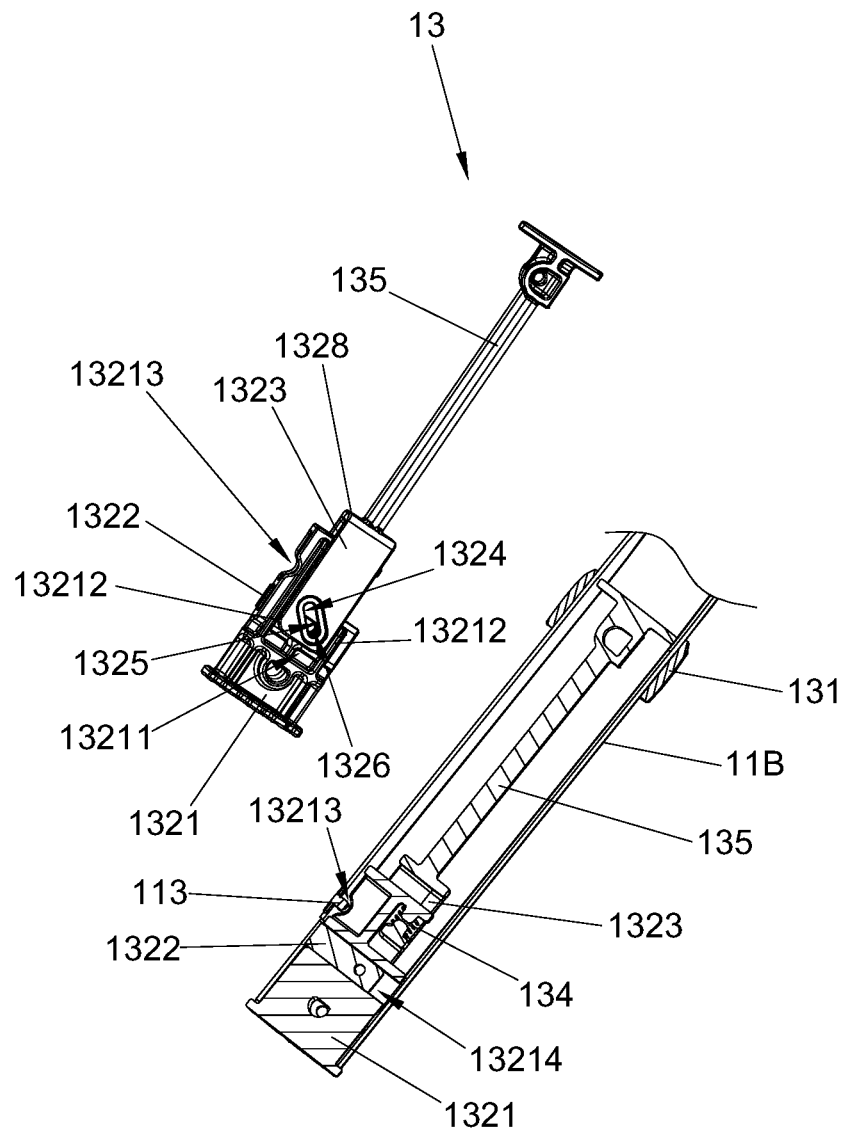
FIG. 8 is a schematic view illustrating the locking mechanism with the latch thereof retracting inward which can correspond to an unlocking state.

Referring to FIGS. 6-8, the actuating part 1323 is connected with the latch 1322 so that the actuating part 1323 and the latch 1322 are movably linked to each other during operation. According to an example of construction, the actuating part 1323 can be integrally formed as a single part, and can be disposed inside the side portion 11B of the handle part 11. The actuating part 1323 can be slidably assembled with the side portion 11B of the handle part 11, and can be slidably connected with the latch 1322. For example, the mount portion 1321 can have a guide slot 13211 defined between two ribs 13212, and the actuating part 1323 can be at least partially received in the guide slot 13211 for sliding relative to the mount portion 1321. The actuating part 1323 can thereby slide relative to the mount portion 1321 and the handle part 11 along a lengthwise axis of the side portion 11B.

The latch 1322 can be slidably connected with the actuating part 1323 via a pin 133. For example, the pin 133 can be fixedly connected with the latch 1322, and can be in sliding contact with any of two ramp surfaces 1324 and 1325 provided on the actuating part 1323, wherein the ramp surfaces 1324 and 1325 are tilted an angle relative to the lengthwise axis of the side portion 11B. According to an example of construction, the actuating part 1323 can have an elongate slot 1326 through which the pin 133 is slidably received, and the two ramp surfaces 1324 and 1325 can be respectively defined by two opposite and parallel inner edges of the elongate slot 1326. For example, the actuating part 1323 can have a U-shaped portion 1328 that extends to two opposite sides of the latch 1322 and the mount portion 1321, the elongate slot 1326 can be provided in the U-shaped portion 1328, and the pin 133 can sideways protrude from the latch 1322 and the mount portion 1321 and can be slidably disposed through the elongate slot 1326. With the construction described herein, the actuating part 1323 and the latch 1322 can move in a concurrent manner for engaging and disengaging the latch 1322 with respect to the side segment 12. For example, the actuating part 1323 can slide in a first direction to urge the latch 1322 to move and disengage from the side segment 12 via a sliding contact between the pin 133 and the ramp surface 1324, and can slide in a second direction opposite to the first direction to urge the latch 1322 to move and engage with the side segment 12 via a sliding contact between the pin 133 and the ramp surface 1325. According to an example of construction, the latch 1322 and the actuating part 1323 can be arranged so as to respectively slide along two axes that are substantially orthogonal to each other.

The spring 134 can be connected with the actuating part 1323, and can apply a spring force that biases the actuating part 1323 in the second direction for urging the latch 1322 to engage with the side segment 12 and thereby lock the handle part 11 to the side segment 12. Examples of the spring 134 may include, without limitation, compression springs or extension springs. According to an example of construction, the spring 134 can have two opposite ends respectively connected with the actuating part 1323 and the mount portion 1321.

Referring to FIGS. 3-8, the locking mechanism 13 can further include an operating part 131 that is carried with the handle part 11 and is connected with the actuating part 1323. The operating part 131 is exposed on the handle part 11 at a suitable location that facilitates its manual operation by a caregiver. For example, the operating part 131 can be disposed at a location on the side portion 11B of the handle part 11 that is above the actuating part 1323. Referring to FIGS. 1 and 2, the operating part 131 may be exemplarily placed at a location on the side portion 11B that has the operating part 131 adjacent to an end of the side segment 12 opposite to the pivot connection 30 when the handle part 11 is in a fully retracted position relative to the side segment 12. This may help to visually indicate when the handle part 11 has reached the fully retracted position.

According to an example of construction, the operating part 131 can be slidably connected with the handle part 11. For example, the operating part 131 can include a sleeve that is disposed around the side portion 11B and can slide upward and downward on the side portion 11B. For limiting the course of the operating part 131 on the handle part 11, the side portion 11B can have an elongate slot 111, and the operating part 131 may be fixedly connected with a protruding element (not shown) that is restricted to slide within the elongate slot 111.

Referring to FIGS. 6-8, the operating part 131 can be connected with the actuating part 1323 via a linking element 135, which can be disposed inside the side portion 11B of the handle part 11. The linking element 135 can be a rod that is respectively connected with the operating part 131 and the actuating part 1323. According to an example of construction, the linking element 135 can be disposed between the operating part 131 and the actuating part 1323, and can have two opposite ends respectively fastened to the operating part 131 and the actuating part 1323. According to another example of construction, the linking element 135 may be formed integrally with the actuating part 1323 and can have a distal end fastened to the operating part 131. Accordingly, the operating part 131, the linking element 135 and the actuating part 1323 can slide in unison relative to the side portion 11B during operation. FIG. 7 illustrates the locking mechanism 13 with the latch 1322 protruding outward which can correspond to a locking state, and FIG. 8 illustrates the locking mechanism 13 with the latch 1322 retracting inward which can correspond to an unlocking state.

Exemplary operation for adjusting an extension of the carrying handle 10 above the infant support portion 20 is described hereinafter with reference to FIGS. 1-8. For adjusting the extension of the carrying handle 10, a caregiver can slide the operating part 131 in a direction D (better shown in FIG. 7) away from the side segment 12. As a result, the actuating part 1323 slides along with the operating part 131 in the same direction D against the biasing force of the spring 134, which urges the latch 1322 to disengage from the side segment 12 and thereby unlock the handle part 11. The handle part 11 then can slide relative to the side segment 12 to reduce or increase the length of the side portion 11B extending outside the side segment 12. Once the handle part 11 has reached a desired extension relative to the side segment 12, the operating part 131 can be released, and the actuating part 1323 can be urged by the spring 134 to slide opposite to the direction D to cause the latch 1322 to engage with one corresponding opening 121 on the side segment 12. As the actuating part 1323 moves under the biasing force of the spring 134, the operating part 131 can slide along with the actuating part 1323 toward the side segment 12 for recovering an initial position corresponding to a locking state. The handle part 11 can be thereby locked in position relative to the side segment 12.

Advantages of the infant carrier described herein include a carrying handle having a handle part that can slide for adjusting an extension of the handle part above an infant support portion of the infant carrier. For example, the handle part of the carrying handle can be adjusted to extend at a suitable height above a child placed in the infant support portion for facilitating transport of the infant carrier. Accordingly, the infant carrier can be more convenient in use.

Realization of the infant carrier have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant carrier comprising:
   an infant support portion;
   a carrying handle including a handle part and a side segment, the side segment being pivotally connected with the infant support portion, and the handle part having a side portion and being slidably connected with the side segment with the side portion telescopically connected with the side segment, the handle part and the side segment being rotatable in unison relative to the infant support portion for adjusting an inclination of the carrying handle, and the handle part being slidable relative to the side segment for adjusting an extension of the handle part from the side segment; and
   a locking mechanism carried with the handle part and operable to lock the handle part to the side segment so that the handle part is held at a desired extension from the side segment, wherein the locking mechanism includes a latch carried with the side portion of the handle part, an actuating part that is disposed inside the side portion of the handle part and is connected with the latch so that the actuating part and the latch are movably linked to each other, and an operating part that is connected with the actuating part and is exposed on the handle part for operation, the operating part being connected with the actuating part via a linking element disposed inside the side portion of the handle part;

wherein the latch is movable to protrude outward or retract toward an interior of the side portion for engaging with or disengaging from the side segment;

wherein the actuating part and the latch are movable in a concurrent manner for engaging and disengaging the latch with respect to the side segment; and wherein the operating part, the linking element and the actuating part are slidable in unison relative to the side portion of the handle part.

2. The infant carrier according to claim 1, wherein the operating part is placed at a location on the side portion that has the operating part adjacent to an end of the side segment when the handle part is in a fully retracted position relative to the side segment.

3. The infant carrier according to claim 1, wherein the latch is slidably connected with the side portion of the handle part.

4. The infant carrier according to claim 1, wherein the actuating part is slidably assembled with the side portion of the handle part, and is slidably connected with the latch.

5. The infant carrier according to claim 4, wherein the latch has a pin, and the actuating part has a first and a second ramp surface, the actuating part sliding in a first direction to urge the latch to disengage from the side segment via a sliding contact between the pin and the first ramp surface, and the actuating part sliding in a second direction opposite to the first direction to urge the latch to engage with the side segment via a sliding contact between the pin and the second ramp surface.

6. The infant carrier according to claim 5, wherein the actuating part has a U-shaped portion that extends to two opposite sides of the latch, the U-shaped portion having an elongate slot through which the pin is slidably received, the first and second ramp surfaces being respectively defined by two opposite inner edges of the elongate slot.

7. The infant carrier according to claim 1, wherein the locking mechanism further includes a spring connected with the actuating part, the spring biasing the actuating part to move in a direction for urging the latch to engage with the side segment.

8. The infant carrier according to claim 1, wherein the operating part is slidably connected with the handle part.

9. The infant carrier according to claim 1, wherein the operating part includes a sleeve disposed around the side portion.

10. The infant carrier according to claim 1, wherein the linking element is a rod respectively connected with the operating part and the actuating part.

11. The infant carrier according to claim 1, being implemented as a child safety seat.

12. An infant carrier comprising:

an infant support portion;

a carrying handle including a handle part and a side segment, the side segment being pivotally connected with the infant support portion, and the handle part having a side portion slidably connected with the side segment, the handle part and the side segment being rotatable in unison relative to the infant support portion for adjusting an inclination of the carrying handle, and the handle part being slidable relative to the side segment for adjusting an extension of the handle part from the side segment; and a locking mechanism carried with the handle part and operable to lock the handle part to the side segment so that the handle part is held at a desired extension from the side segment;

wherein the locking mechanism includes a latch that is carried with the side portion and is movable to engage with and disengage from the side segment, and an operating part that is disposed around the side portion and is slidable upward and downward along the side portion to cause the latch to disengage from and engage with the side segment.

13. The infant carrier according to claim 12, wherein the latch is movable to protrude outward or retract toward an interior of the side portion for engaging with or disengaging from the side segment.

14. The infant carrier according to claim 12, wherein the operating part is placed at a location on the side portion that has the operating part adjacent to an end of the side segment when the handle part is in a fully retracted position relative to the side segment.

15. The infant carrier according to claim 12, wherein the locking mechanism further includes an actuating part connected with the latch so that the actuating part and the latch are movably linked to each other, the actuating part and the latch being movable in a concurrent manner for engaging and disengaging the latch with respect to the side segment.

16. The infant carrier according to claim 15, wherein the operating part is connected with the actuating part via a linking element disposed inside the side portion of the handle part, and the operating part, the linking element and the actuating part are slidable in unison relative to the side portion of the handle part.

17. The infant carrier according to claim 15, wherein the actuating part is slidably assembled with the side portion of the handle part, and is slidably connected with the latch.

18. The infant carrier according to claim 15, wherein the latch has a pin, and the actuating part has a first and a second ramp surface, the actuating part sliding in a first direction to urge the latch to disengage from the side segment via a sliding contact between the pin and the first ramp surface, and the actuating part sliding in a second direction opposite to the first direction to urge the latch to engage with the side segment via a sliding contact between the pin and the second ramp surface.

19. The infant carrier according to claim 18, wherein the actuating part has a U-shaped portion that extends to two opposite sides of the latch, the U-shaped portion having an elongate slot through which the pin is slidably received, the first and second ramp surfaces being respectively defined by two opposite inner edges of the elongate slot.

20. The infant carrier according to claim 15, wherein the locking mechanism further includes a spring connected with the actuating part, the spring biasing the actuating part to move in a direction for urging the latch to engage with the side segment.

* * * * *